United States Patent
Paakkunainen

[19]
[11] Patent Number: 6,109,378
[45] Date of Patent: *Aug. 29, 2000

[54] LEG MECHANISM

[75] Inventor: Marko Paakkunainen, Tampere, Finland

[73] Assignee: Plustech Oy, Tampere, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/886,397

[22] Filed: Jul. 1, 1997

Related U.S. Application Data

[63] Continuation-in-part of application No. PCT/FI96/00583, Oct. 31, 1996, abandoned.

[30] Foreign Application Priority Data

Nov. 6, 1995 [SE] Sweden .................................... 955297

[51] Int. Cl.⁷ .................................................. B62D 51/06
[52] U.S. Cl. .................................. 180/8.5; 901/1; 180/8.6
[58] Field of Search .............................. 180/8.1, 8.2, 8.5, 180/8.6; 901/1, 9, 22, 15; 74/490.01, 490.05, 490.1; 414/DIG. 917, 680

[56] References Cited

U.S. PATENT DOCUMENTS

| | | |
|---|---|---|
| 3,002,578 | 10/1961 | Kraüs . |
| 3,160,290 | 12/1964 | Wilson ................................ 414/680 |
| 3,703,968 | 11/1972 | Ulrich et al. ......................... 414/680 |
| 4,049,070 | 9/1977 | Soyland ................................ 180/8.5 |
| 4,202,423 | 5/1980 | Soto . |
| 4,212,087 | 7/1980 | Mortensen ............................. 623/26 |
| 4,502,556 | 3/1985 | Bartholet ............................. 180/8.6 |
| 4,527,650 | 7/1985 | Bartholet . |
| 4,558,758 | 12/1985 | Litttman et al. . |
| 4,565,487 | 1/1986 | Kroczynski ........................... 414/730 |
| 4,645,084 | 2/1987 | Deike .................................. 212/271 |
| 4,662,465 | 5/1987 | Stewart . |
| 4,779,691 | 10/1988 | Werdner . |
| 5,137,101 | 8/1992 | Schaeff . |
| 5,343,397 | 8/1994 | Yoshino et al. . |
| 5,353,886 | 10/1994 | Paakkunainen . |

FOREIGN PATENT DOCUMENTS

| | | |
|---|---|---|
| 0 119 409 | 9/1984 | European Pat. Off. . |
| WO 95/29836 | 11/1995 | WIPO . |

*Primary Examiner*—Kevin Hurley
*Assistant Examiner*—Andrew J. Fischer
*Attorney, Agent, or Firm*—Pollack, Vande, Sande & Amernick, RLLP

[57] ABSTRACT

A leg mechanism for moving a body comprising an upper arm pivotably connected to the body by a hip joint, and a lower arm pivotably connected to the opposite end of the upper arm by a knee joint. The lower end of the lower arm comprises a walk element for contacting a surface over which the body is moved. Between the upper arm and the body at the hip joint, and between the upper arm and the lower arm at the knee joint, respectively, there is an actuator for effecting the pivotal movement of the corresponding joint. At one of the joints there is, in addition to an active actuator, also a passive force-transmitting element arranged to transmit a change in a pivoting angle taking place at the joint under the effect of the active actuator and an external load. The passive force-transmitting element transforms the change into a force which is transmitted to a receiving actuator which effects a change in the position of the lower end of the lower arm to compensate for the change in the pivoting angle.

15 Claims, 5 Drawing Sheets

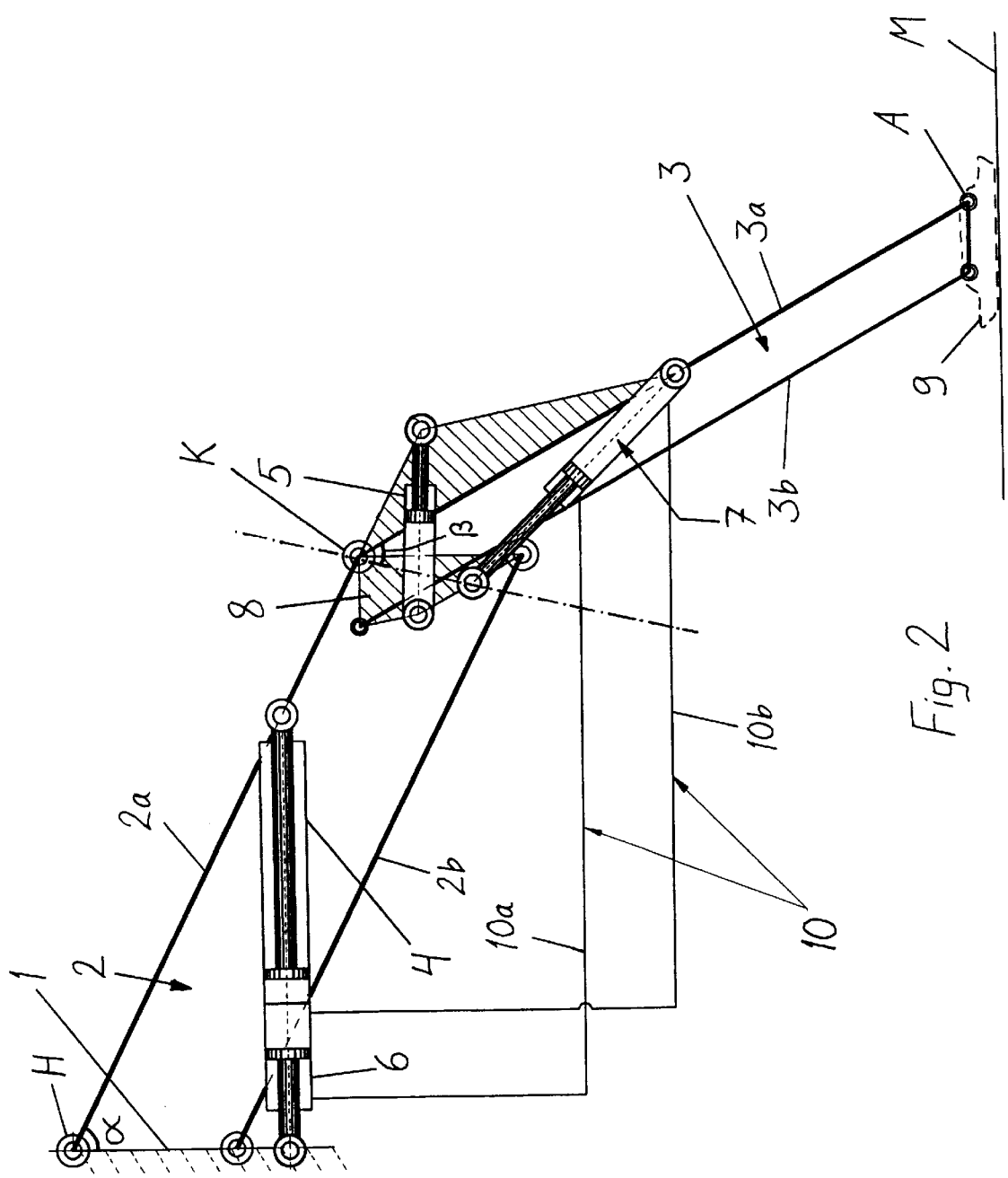

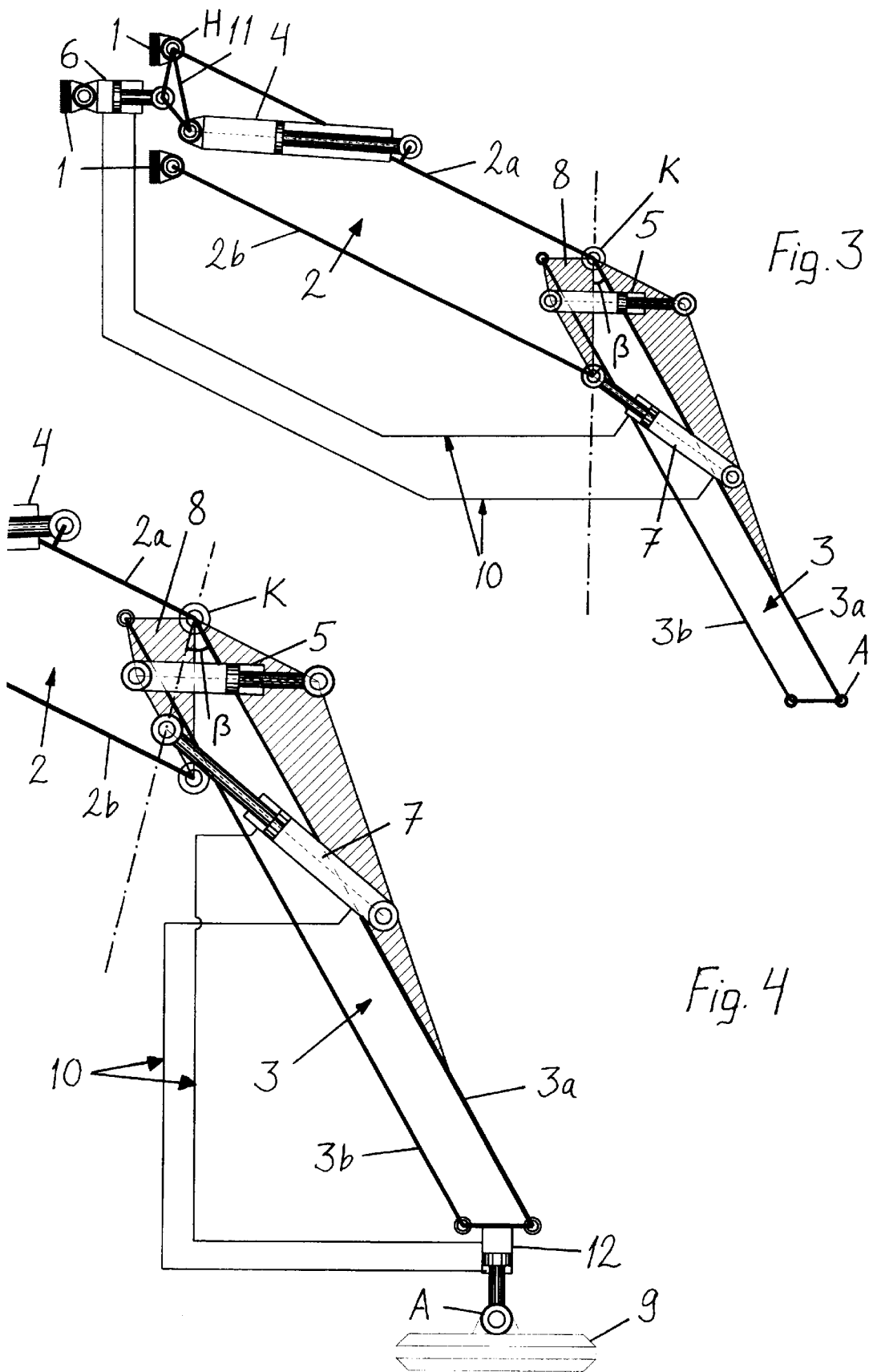

LEG MECHANISM

The present application is a continuation-in-part of U.S. application Ser. No. PCT/EI96/00583 filed Oct. 31, 1996, now abandoned.

BACKGROUND OF THE INVENTION

The present invention relates to a leg mechanism.

The purpose of a load-carrying leg mechanism is described particularly in the U.S. Pat. No. 5,353,886 of the same applicant. The purpose of the leg mechanisms of this kind is on one hand to support a load caused by the body of the device which they are carrying and on the other hand to accomplish advancing movement. Such leg mechanisms having an upper arm and a lower arm are commonly used in conjunction with so-called "walking machines". The model for the movements of such machines is obtained from the legs of mammals where the walking movement causing the advancement is dependent on movement paths of the thigh (upper arm) joined to the body (frame) through the hip joint and the shin (lower arm) joined thereto through the knee joint. These paths are created as a result of pivotal movements taking place with respect to the joints.

When the movement paths of the nature are imitated by machines, high demands are set on actuators moving the above-mentioned parts and on the control operations related thereto. In order to have correct movements of the leg mechanism in view of the movement paths and load situations at every moment, the control and steering systems must be highly sophisticated and functionally reliable to permit the advancing movement and the supporting of the load without any disturbances.

SUMMARY OF THE INVENTION

It is the object of the present invention to eliminate the above-mentioned drawbacks and to present a solution related to the mechanism itself, to increase the functional reliability of the leg and to improve the efficiency. For achieving this goal the leg mechanism according to the invention is mainly characterized in that the angular change occurring at one joint can be transmitted by means of a particular passive force-transmitting means to a movement of another actuator or joint compensating the angular change for performing the desired path of movement. No active actuator needs to be used in junction with this latter actuator or joint to bring about the corresponding desired movement, but the movement caused by the angular change takes place automatically.

According to an advantageous alternative, the passive force-transmitting means transmits the movement of the knee joint to take place as a movement of the hip joint. For example, when the absolute value of the knee joint angle is increased, that is, the lower arm (shin) moves away from a predetermined ;middle position, the corresponding hip joint angle facing the support surface will be decreased. The support point at the lower end of the lower arm will in this case perform a linear or approximately linear movement, depending on the dimensioning design.

Alternatively, the lower end of the lower arm is made variable in length in such a fashion that when the absolute value of the knee joint angle is increased, the support point at the lower end of the arm will be shifted farther from the rest of the arm during the operation of an actuator acting between the arm and the support point.

As far as other preferred alternatives of the invention are concerned, reference is made to the description to follow.

The invention will be described in the following with reference to the accompanying drawings, wherein:

BRIEF DESCRIPTION OF THE DRAWINGS

FIG. 2 is a schematic representation of a slightly modified embodiment as compared with the embodiment of FIG. 1.

FIG. 3 shows an alternative embodiment for the construction of the hip joint,

FIG. 4 shows an alternative embodiment for the compensation of the movements,

DETAILED DESCRIPTION OF THE PREFERRED EMBODIMENT

Figure 1:
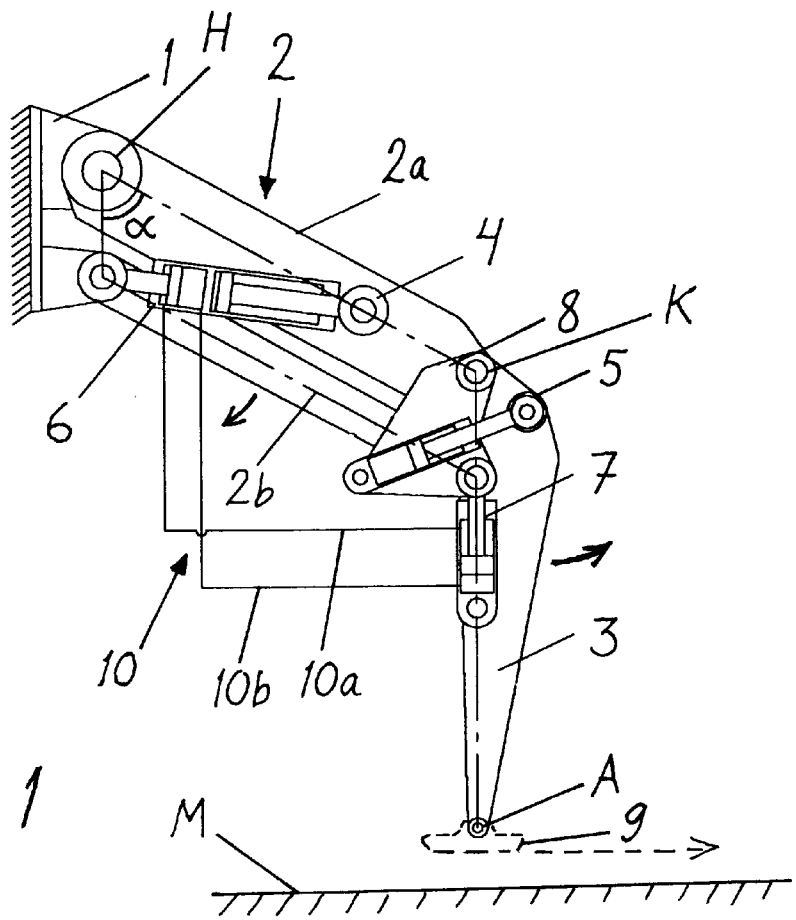
FIG. 1 is a side view of the leg mechanism according to the invention and the pertaining actuators.

FIG. 1 shows a first embodiment of a leg mechanism according to the invention in side view. The leg mechanism is connected to a body 1 carried thereby. The connection is made through a hip joint H, to which is connected pivotally an upper arm 2 of the mechanism, the arm being pivotable in a vertical plane. A lower arm 3 is connected pivotally to the other end of the upper arm 2 through a knee joint K, the arm being pivotable in a vertical plane. At the lower end of the lower arm 3 there is a support point A receiving the load caused by the contact with the surface for walking M and having a walk element 9 pivotally connected thereto. The change of an angle α formed between the longitudinal axis of the upper arm 2 and the vertical plane and facing the surface for walking M is effected by means of an active length-variable actuator 4, the first end of which is mounted on the body 1 and the other end on the upper arm 2. Correspondingly, at the knee joint K there is another active length-variable actuator 5, the first end of which is mounted on the upper arm 2 and the second end on the lower arm 3. The change of length of this other actuator causes a change in an angle β facing the surface for walking M and formed between a predetermined zero line, e.g. a vertical line parallel to a line vertical with respect to the machine body 1, and the longitudinal axis of the lower arm. In the position of FIG. 1 this angle β has the value of zero, because the longitudinal axis of the lower arm 3 is coincident with the line serving as the zero line.

The above-described functions caused by the active actuators are known and they can be accompanied using actuators 4, 5 operated by a pressurized medium, such as hydraulic cylinders, connected to a source of pressurized medium and being controllable by valves in a known manner.

A passive force-transmitting means 7 is disposed at the knee joint K, the means receiving its driving force from an external load acting on the walk element as well as from the movement of the active actuator 5 located at the same joint K for changing the joint angle β. The means is provided for transmission of the movement to a receiving actuator 6 located at the hip joint H. This will cause in the angle α of the hip joint H a change that compensates the change of the angle β of the knee joint K.

FIG. 1 shows the situation where the leg is off the surface for walking M. If, for instance, the angle β is increased which means that the lower arm 3 (shin) is swinging forward from its middle position where the value of the angle β is zero, the angle α is decreased, that is the, upper arm 2 descends, as illustrated by arrows in the Figure. With a correct transmission of the above-mentioned force, this allows the support point A at the lower end of the lower arm 3 to be moved approximately along a horizontal movement path which is illustrated by a broken line in FIG. 1. In this case a movement of the active actuator 4 of the hip joint H is not needed for accomplishing the corresponding movement, but it can be used separately from the receiving actuator 6 for height adjustment of the entire leg mechanism. In this way the leg mechanism can be lifted off the surface for walking M by means of the active actuator 4 prior to taking the next step. Further, if it is desired to lift the leg mechanism to a higher position because of an obstacle ahead, the active actuator 4 of the hip joint H is used, causing the lifting of the upper arm 2 and the lower arm 3 concurrently therewith. The above-described linked movement of the lower arm 3 and the upper arm 2 can be accomplished by means of the actuator 5 of the knee joint K independently of each momentary height position of the upper arm 2, that is, independently of the angle α.

With the leg in contact with the surface for walking M, the operation is the following. In the beginning of the support phase of the step the leg mechanism can be positioned against the ground by means of the active actuator 4 of the hip joint H, whereby the upper arm 2 descends, most preferably when the lower arm 3 is pivoted forward from the vertical line, away from the upper arm 2 to the extent of the angle β. In this event the load of the body 1 carried by the leg mechanism is directed partly to this leg mechanism as the other leg mechanisms of the machine receive simultaneously their share of the load. The knee joint K is turned by means of the actuator 5, causing a decrease in the angle which depending on the length of the step can attain the value of zero corresponding to the middle position of the lower arm 3, and turn to, negative, as a result of which, the absolute value of the angle β will increase again. Following the same order, the angle a increases, reaches its maximum when the angle β is zero, and decreases thereafter. In an ideal case, the height position of the body 1 carried by the leg mechanism remains the same by virtue of the compensation, in other words, the leg mechanism corresponds functionally to a wheel.

The actuators moving the upper arm 2, the active actuator 4 and the actuator 6 receiving the moving power from the passive force-transmitting means 7 are of a length-variable type, and they are coupled one after the other in such a way that the fixing point of the active actuator 4 on the body 1 is constituted of the end of the receiving actuator 6 next to the cylinder and directed towards the upper arm 2, and the second end of this actuator 6 is attached to the body 1 itself. As the length of the receiving actuator 6 changes, the length of the active actuator 4 does not change automatically, and hence the length change in the entity formed by the actuators turning the upper arm 2 is due solely to the length change of the receiving actuator 6. A corresponding situation, where only one of the actuators causes the total length change, occurs when the upper arm 2 is moved by means of the active actuator 4, because the actuators can be steered independently of each other and they are coupled one after the other only mechanically. During the simultaneous use of both active actuators 4 and 5, the length change of the combined actuator, is due to the joint action of the actuators 4 and 6.

In practice, the transmission of movement-generating forces from the knee joint K to the hip joint H takes place by means of a pressurized medium, e.g. hydraulic oil, using a so-called passive circuit 10. The actuator constituting the force-transmitting passive means 7 is at its first end mounted on the upper arm 2 and at its second end on the lower arm 3. As the angle β of the knee joint K increases from the middle position of the lower arm shown in FIG. 1 with the longitudinal axis of the arm in vertical position with respect to the machine body 1, the pressurized medium is transferred from the actuator chamber around the piston rod to the chamber around the piston rod of the receiving actuator 6 along a line 10a of the circuit 10, whereby the receiving actuator 6 is contracted during the extension of the means 7. The opposite sides of the pistons are mutually connected via a return line 10b of the pressurized medium to create a closed circuit. The dimensioning of the pistons and chambers is carried out so as to make the volume changes in the mutually interconnected sides to correspond to each other, and in addition so that at a certain value of the angle α the change of the angle β brings about a change of correct magnitude in the angle α. The combination of the actuators 4 and 5 is a so-called tandem cylinder.

In addition to advantageous paths of movement, the invention also provides a braking function. For instance, when the machine stands on the surface for walking M supported by the leg mechanism, the diverting of the lower arm 3 from the middle position shown in FIG. 1 will immediately cause the lowering of the upper arm 2 with respect to the body 1. The same phenomenon takes place when the lower arm 3 is in a position where it is pivoted forward or backward and when the absolute value of the angle β tends to increase. From the point of view of forces, this has effect on the knee joint K that the active actuator 5 of the knee can be dimensioned smaller than usual.

FIG. 1 further shows an advantageous mechanism by means of which the upper arm 2 and the lower arm 3 are joined to the body and to each other. The upper arm 2 is formed of a parallelogram linkage mechanism comprising a main arm 2a predominately receiving the load and constituting one long side of the parallelogram, and also serving as a point of attachment for the active actuator 4. The mechanism further comprises an auxiliary arm 2b constituting the second long side of the parallelogram. The main arm and the auxiliary arm are pivotally connected to the body 1, and the parallelogram is completed at the opposite end by a link 8, which pivotally connects the arm ends to each other and contains the shorter side of the parallelogram. The axis of the pivotal joint between the link 8 and the main arm 2a coincides at the same time with the pivotal axis of the knee joint K between the main arm 2a and the lower arm 3.

The link 8 is formed of a plate-like piece, the plane of which is situated substantially in the pivotal plane of the mechanism. The active actuator of the knee joint K is attached to this plate at its one end, and its opposite end is attached to the lower arm 3.

The passive means 7 transmitting the moving power is in turn pivotally connected at one end to the link 8 and at its other end to the lower arm 3. Further, the pivot axis in the connecting point between the means 7 and the link 8 can be coincident with the pivot axis between the link 8 and the auxiliary arm 2b, as shown in FIG. 1.

The length-variable passive means 7 is further so positioned that it is at its shortest, that is, at its dead center, when the connecting points thereof coincide with a line between the knee joint K and the support point A at the lower end of the lower arm 3 when this line is in the middle position shown by FIG. 1. In the embodiment according to FIG. 1 this has been realized in a manner that the point of pivotal connection of the means 7 to the lower arm 3 is disposed on this line, and the point of pivotal connection to the upper arm 2 is situated in the lower point of articulation of the link 8 on the shorter side of the parallelogram. This shorter side is coincident with the line or longitudinal axis of the lower arm 3 in its middle position, where the angle β has the value of zero. In the shortest position of the passive means 7 the receiving actuator 6 is in turn in its longest position. It is self-evident that the longitudinal axis of the lower arm 3 can in its middle position be directed in another way with respect to the shorter side of the parallelogram linkage, and the point of attachment of the passive means 7 to the upper arm 2 can be provided elsewhere than in a point of articulation in the parallelogram linkage. Also, in this case, it is possible to have such an arrangement that the longitudinal axis of the means 7 will coincide with the longitudinal axis of the lower arm 3 in certain middle positions of the lower arm 3.

FIG. 2 shows schematically an embodiment which has a somewhat different mechanism than the embodiment of FIG. 1. The difference of the attachments of the receiving actuator 6 and the active actuator 4 lies in that, while in the embodiment of FIG. 1 the pair of actuators on the side of the body 1 is attached to the point of articulation between the auxiliary arm 2b and the body, in the embodiment of FIG. 2 it is attached to a separate point of articulation on the body. This arrangement does not, however, affect the basic functions of the mechanism. Furthermore, also in the lower arm 3 a parallelogram linkage construction is used, comprising a main arm 3a extending between the knee joint K and the support point A and predominately receiving the load, and parallel thereto an auxiliary arm 3b, the upper end of which is pivotally connected to the link 8 and the lower end is pivotally connected to the walk element 9, to which also the support point A is pivotally connected. By virtue of this embodiment the walk element 9, which can be a piece having the shape of a saucer or other shape lying against the surface for walking M, is maintained in the same direction with respect to the body 1. Further, the passive force-transmitting means 7 is at an end next to the upper arm 2 pivotally connected to the link 8 and at the other end to the arm 3a. In other respects the operation of the mechanism is the same as described above.

FIG. 3 shows an alternative embodiment for the hip joint H. The upper arm 2 and the lower arm 3 are constituted of parallelogram linkage constructions as in FIG. 2. The upper arm 2 is pivotally connected to the body 1 at points of articulation which form the shorter side of the parallelogram linkage construction. The active actuator 4 and the receiving actuator 6 are mechanically connected together in such a fashion that the receiving actuator 6 is pivotally connected to the body 1 and at its opposite end it is pivotally connected to a lever arm 11, which is pivotally connected to the body 1, in this case to one of the points of articulation of the parallelogram linkage. The lever arm carries at its opposite end the end of the active actuator 4 facing the body. The embodiment differs from the tandem cylinder solution shown in FIGS. 1 and 2, but in other respects a similar effect can be obtained by using it: the active actuator 4 and the receiving actuator 6 influence together the pivoting of the upper arm 2 in such a way that they are capable of acting independently, and their changes in length jointly determine the change of the position of upper arm 2 and the change of the angle α. Further, in the embodiment according to FIG. 3 the passive actuator of the knee is at its lower end attached in such a fashion that the point of attachment does not lie on the longitudinal axis of the arm 3. This has, however, no effect on the basic functions of the mechanism.

FIG. 4 shows an embodiment where a compensating function can be achieved in another way than by acting on the hip joint H through the passive force-transmitting means 7 at the knee joint K. In this case all that is, needed at the hip joint H is the active actuator 4, the end of which is attached to the upper arm 2, as shown in the Figure. The compensating function is achieved by arranging the lower end of the lower arm 3 to be variable in length by fixing a length-variable actuator 12 thereon. As the angle β increases, the length change of the passive force-transmitting means 7 will be transmitted to constitute the length change of the receiving actuator 12 compensating the change of position of the lower arm 3 in such a way that the actuator 12 gets longer, and consequently the support point A at its lower end and the walk element 9 are shifted down. As the angle β decreases, the length changes occur in reverse direction. Also in this construction it is possible to define a certain middle position or zero line, where the angle β is zero and the receiving actuator 12 at its shortest, and any deviation of the position of the lower arm 3 to either direction will cause a shift of the support point A at the lower end of the arm to a lower position.

Also in the embodiment of FIG. 4 the forces are transmitted between the knee joint K and the lower end of the lower arm 2 by means of a pressurized medium, for example hydraulic oil, by using the passive circuit 10. The principle is the same as described above with reference to FIGS. 1–3.

The lower end of the lower arm 3 is realized structurally by mounting rigidly the receiving actuator 12 on the shorter side of the arm 3 of the parallelogram linkage construction. The lower end of the actuator, in the present case the piston rod end of the hydraulic cylinder, is pivotally connected to a saucer-like walk element 9 at the point A, which can be regarded as the support point at the lower end of the arm, through which point the forces are transmitted between the surface for walking M and the body 1.

The invention is not limited hereinabove as far as the limits of movement of the leg mechanism are concerned. The leg mechanism has, however, preferably such a construction that the lower arm 3 has a well-defined middle position, which for the above-described compensation movements is also the extreme position, where the angle α of the hip joint H obtained through the compensation is at its largest, or respectively the variable length of the lower end of the lower arm 3 is at its shortest, the angle β being zero. This middle position where the longitudinal axis of the arm 3 is coincident with a predetermined zero line, can be selected in a way which is statically advantageous, for instance it can be a line extending in a certain direction with respect to the machine body 1. This is possible by virtue of the parallelogram construction of the upper arm 2, because the lower arm 3 extending at a certain angle to the upper arm 2 is always at an accurately predetermined angle to the body 1 as well.

Figure 5:
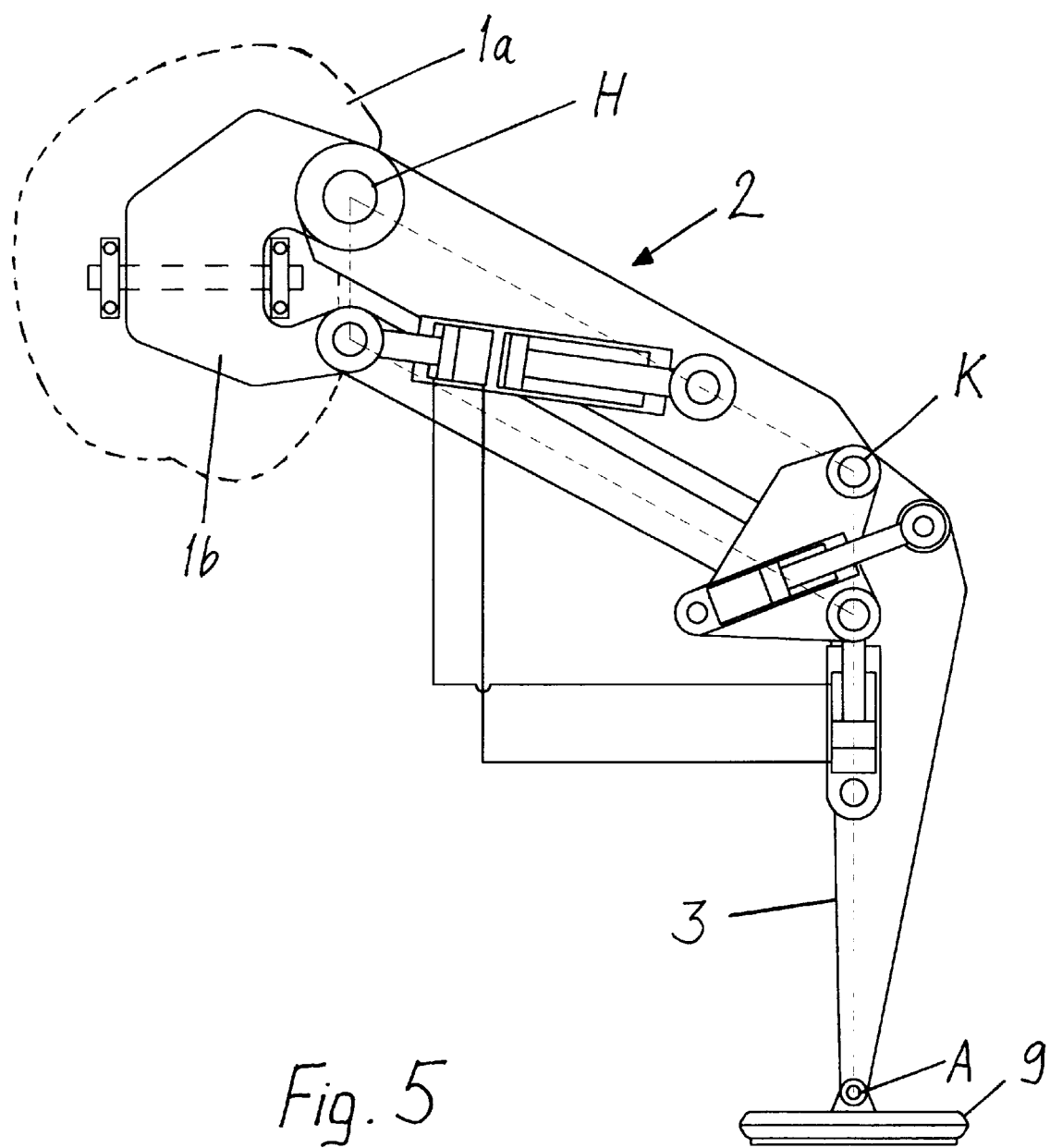
FIG. 5 illustrates the alternatives of connecting the leg mechanism to the body.

FIG. 5 illustrates how the leg mechanism can be joined at the hip joint H to the body 1 by connecting it pivotally to an auxiliary body 1b which is pivotable with respect to the rest of the body 1a. Hence, the whole leg mechanism can turn within the movement boundaries determined by the joint between the actual body and the auxiliary body 1b.

Figure 6:
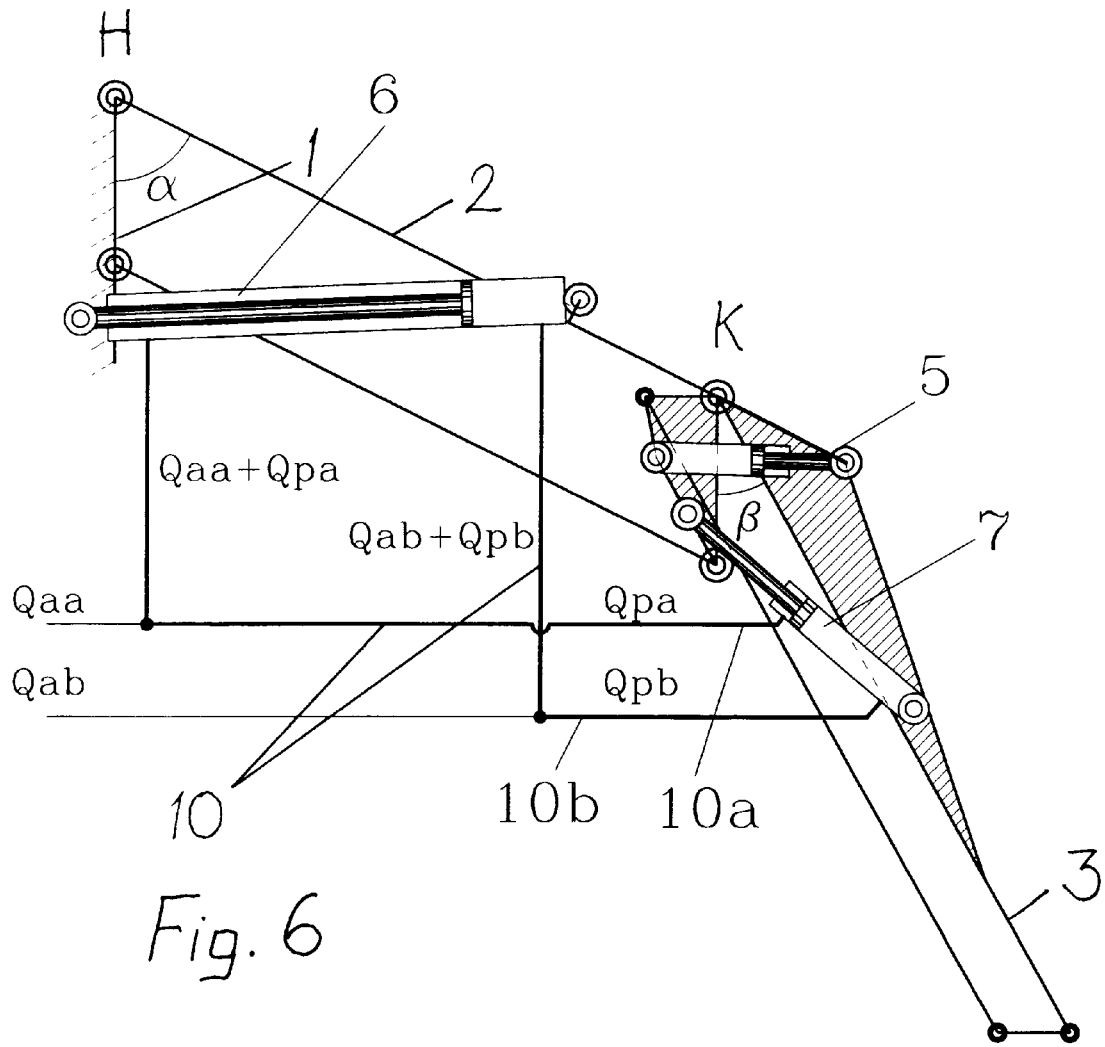
FIG. 6 shows one embodiment of the actuator at the hip joint.

FIG. 6 shows an embodiment where the receiving actuator and the active actuator are integrated to a single unit 6 transmitting force to change the angle α at the hip joint H. The unit is fastened between the body 1 and the upper arm 2 in such a way that its movement will change the pivoting angle α of the upper arm with respect to the body. The unit 6 is connected to the force-transmitting means 7 in the same manner as the receiving actuator 6 of FIGS. 1 to 3 and 5, that is, through a pair of control lines 10a, 10b, through which the change in the absolute value of the pivoting angle at the knee joint K is transmitted from the force-transmitting means 7 to the unit 6 for shifting a part in the unit 6 so that the movement of the unit 6 causes an opposite change in the pivoting angle α. A control line for the active actuator for actively moving the upper arm 2 and changing the pivoting angle is connected parallel to the respective control line 10a, 10b so that they jointly cause the part of the unit 6 to move in a direction determined by the overall control caused by a line from the passive means 7 and a line for actively changing the angle α.

Also in the embodiment of FIG. 6, the control takes place by means of a pressurized medium which flows in a passive circuit 10 formed by the control lines 10a, 10b, and the unit 6 and the passive force-transmitting means are accomplished as cylinders operated by pressurized medium. The movable part in the unit 6 is the piston and its rod, and the control lines 10a, 10b connect the opposite chambers of one cylinder to the opposite chambers of the other cylinder according to the same principle as described above.

Control lines for actively moving the unit 6 are connected parallel to the lines 10a, 10b of the passive circuit 10, and the flow in these active control lines is controlled in a usual way by means of a directional control valve. The volumetric flow to the chamber where the increase in volume tends to shorten the unit 6 and decrease the angle α is the sum $Q_{aa}+Q_{pa}$ of the volumetric flow from one of the active lines (flow $Q_{aa}$) and from the passive control line 10a (flow $Q_{pa}$) from the chamber where the decrease in volume is caused by the lengthening of the passive means 7 as a result of increase in the absolute value of the pivoting angle β. On the other hand, the volumetric flow to the chamber where the increase in volume tends to lengthen the unit and increase the angle α is the sum $Q_{ab}+Q_{pb}$ of the volumetric flow from the other of the active lines (flow $Q_{ab}$) and from the passive control line 10b (flow $Q_{pb}$)' from the chamber where the decrease in volume is caused by the shortening of the passive means 7 as a result of decrease in the absolute value of the pivoting angle β. It is to be understood that the flows can have also a negative sign with analogous consequences. If the control valve of the active lines is closed, the movements of the unit 6 are determined solely by the passive circuit 10, and if the actuator 5 does not move the knee joint K, the movements of the unit 6 are determined solely by the volumetric flows $Q_{aa}, Q_{ab}$ of the active control lines. However, the movement of the unit 6 can be caused simultaneously both through the active control and through the passive circuit according to the principles explained above.

Compared with the double-piston tandem cylinders shown by FIGS. 1, 2 and 5, the unit 6 is accomplished by means of a simpler construction by using an ordinary double-acting hydraulic cylinder comprising one piston.

Figure 7:
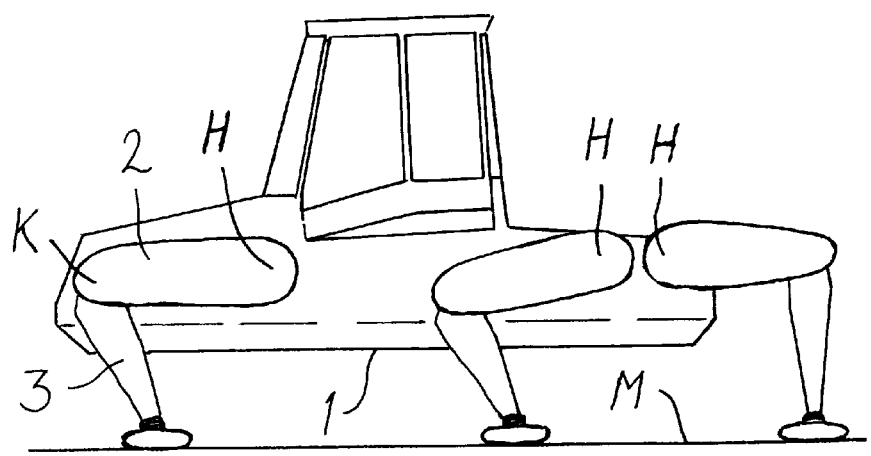
FIG. 7 shows a machine where the leg mechanism according to the invention is applicable.

For the purposes of example, FIG. 7 shows a machine where the leg mechanism according to the invention can be applied. It is concerned with a machine capable of moving in terrain and intended for work in the forest. The machine has six legs articulated to the body, three on each side. The pivoting plane of the leg mechanism extends in the advancing direction in this embodiment and pivoting plane can also be pivoted in another plane, because the hip joint H is mounted on a piece pivotable with respect to the rest of the body, for example on an auxiliary body 1b shown in FIG. 5. The invention can, however, be used in machines of other types, which can have a different number of legs and different ways of articulation on the body.

As far as the leg mechanism itself is concerned, the invention is not restricted only to the embodiments shown above, but it can be modified within the inventive idea presented by the claims. For example, it is not necessary that the pair of actuators 4, 6 be coupled mechanically one after the other in the way shown by FIGS. 1–3. Nevertheless, if they have their own points of articulation, the possibility of free movement must be provided in the active actuator 4, for example in the case of a hydraulic cylinder a free circulation between the chambers on the opposite sides of the piston, because it also will move during the operation of the receiving actuator 6.

The leg mechanism can be realized structurally also in such a way that the actuators are located inside the arms 2 and 3. For example the representation of FIG. 1 can be understood as a side view, where the actuators are outside the arms, but also as a sectional view taken along the middle vertical plane of the arm, in which case the pivoting arms are constituted of pairs of parallel subarms, inside which the actuators are articulated between the subarms.

The invention can, with appropriate changes, be used also in conjunction with a leg mechanism containing force couples of active actuators, described in the earlier U.S. Pat. No. 5,353,886 of the applicant, which is incorporated herein by reference.

What is claimed is:

1. A combination of a leg mechanism and a body, said leg mechanism being connected to said body, and comprising:
    an upper arm having first and second ends, said upper arm pivotably connected at said first end to said body by a hip joint;
    a lower arm pivotably connected at said second end to said upper arm by a knee joint such that a pivoting movement about said knee joint causes a change in a pivoting angle β between said lower arm and a reference line;
    said lower arm having a lower end comprising a walk element for contacting a surface over which said body is moved;
    a first actuator connected between said body and said upper arm for pivoting said upper arm about said hip joint;
    a second actuator connected between said upper arm and said lower arm for pivoting said lower arm about said knee joint;
    a passive force-transmitting means coupled to said lower arm and is responsive to said change in said pivoting angle β between said lower arm and said reference line; and
    a receiving actuator coupled to said passive force-transmitting means and kinetically coupled to said leg mechanism to change the position of said lower end of said lower arm;
    wherein:
        said passive force-transmitting means transforms said change into a force which is transmitted to said receiving actuator;
        whereby a change in the position of said lower end is effected by said receiving actuator to compensate for said change in said pivoting angle β.

2. The leg mechanism of claim 1, wherein said passive force-transmitting means is adjacent said knee joint.

3. The leg mechanism of claim 1, wherein said receiving actuator is adjacent said hip joint, the receiving actuator effecting a change in a pivoting angle α between a longitudinal axis of said upper arm and a vertical plane.

4. The leg mechanism of claim 1, wherein said receiving actuator is at said lower end and effects a change in the length of said lower arm.

5. The leg mechanism of claim 1, wherein said passive force-transmitting means and said receiving actuator are variable in length.

6. The leg mechanism of claim 3, wherein said receiving actuator and said first actuator are variable in length, and are connected to each other such that their combined change in length determines the change in the pivoting angle $\alpha$.

7. The leg mechanism of claim 5, wherein said first and second actuators, said passive force-transmitting means and said receiving actuator are cylinders operated by a pressurized medium.

8. The leg mechanism of claim 1, wherein said upper arm comprises members linked together in a parallelogram shape.

9. The leg mechanism of claim 8, wherein said members include a link connected to a first end of said second actuator whose second end is connected to said lower arm adjacent said knee joint.

10. The leg mechanism of claim 9, wherein said passive force-transmitting means comprises a first end connected to said link and a second end connected to said lower arm.

11. The leg mechanism of claim 8, wherein said lower arm comprises members linked together in a parallelogram shape which comprises two longer sides and two shorter sides.

12. The leg mechanism of claim 11, wherein said receiving actuator is at said lower end and effects a change in the length of said lower arm, and is mounted on one of the shorter sides of said parallelogram shape.

13. The leg mechanism of claim 3, wherein said receiving actuator and said first actuator constitute a single force-transmitting unit comprising:

a part acted upon jointly by a control line of said first actuator and by a control line of said receiving actuator, for shifting said part in a first direction to increase said pivoting angle $\alpha$, and for shifting said part in a second direction to decrease said pivoting angle $\alpha$.

14. The leg mechanism of claim 13, wherein said single force-transmitting unit is variable in length.

15. The leg mechanism of claim 14, wherein said single force-transmitting unit is a cylinder operated by a pressurized medium.

\* \* \* \* \*